United States Patent [19]

Knoblauch et al.

[11] Patent Number: 4,548,799

[45] Date of Patent: Oct. 22, 1985

[54] PROCESS FOR RECOVERING NITROGEN FROM OXYGEN-CONTAINING GAS MIXTURES

[75] Inventors: Karl Knoblauch, Essen; Heinz Heimbach, Essen-Heidhausen; Burkhard Harder, Oberhausen, all of Fed. Rep. of Germany

[73] Assignee: Bergwerksverband GmbH, Essen, Fed. Rep. of Germany

[21] Appl. No.: 587,241

[22] Filed: Mar. 7, 1984

[30] Foreign Application Priority Data

Mar. 7, 1983 [DE] Fed. Rep. of Germany ....... 3307974

[51] Int. Cl.$^4$ .......................... C01B 21/00; B01J 8/00; B01J ; B01D 51/00
[52] U.S. Cl. ........................................ 423/351; 55/25; 55/26; 423/239
[58] Field of Search ................... 423/239, 239 A, 235, 423/235 A, 351; 55/25, 26

[56] References Cited

U.S. PATENT DOCUMENTS

| | | | |
|---|---|---|---|
| 4,203,958 | 5/1980 | Snarski | 423/351 |
| 4,386,945 | 6/1983 | Gardner | 55/26 |
| 4,415,340 | 11/1983 | Knoblauch et al. | 55/25 |
| 4,440,548 | 4/1984 | Hill | 55/26 |
| 4,494,966 | 1/1985 | Vmeki | 55/26 |

FOREIGN PATENT DOCUMENTS 2932333  2/1981  Fed. Rep. of Germany .
3146189  5/1983  Fed. Rep. of Germany .
3207089  9/1983  Fed. Rep. of Germany .

OTHER PUBLICATIONS

Druckwechsel-Adsorptionsanlagen—Grundlagen und Anwendung, II, H. Juntgen, B. Harder, K. Knoblauch, (Technik Im Betrieb, pp. 87–90).

*Primary Examiner*—Gregory A. Heller
*Attorney, Agent, or Firm*—Karl F. Ross; Herbert Dubno

[57] ABSTRACT

A gas mixture containing significant proportions of nitrogen and oxygen, such as atmospheric air, is alternately passed through two adsorbers containing a carbonaceous molecular sieve such as comminuted coke. With one-minute half-cycles, each half-cycle encompasses a production phase of 55 seconds during which the gas mixture is driven under high pressure through one adsorber with recovery of high-purity nitrogen therefrom while the other adsorber is being exhausted or vented in a regeneration phase. During a small fraction of the remaining 5 seconds of this half-cycle, preferably lasting between 0.3 and 0.7 second, the two adsorbers are interconnected for a partial equalization of their pressures. In the final period of slightly more than 4 seconds, the regeneration phase of the first adsorber begins while the second adsorber is pressurized with fresh gas mixture, its outlet being closed at that time. The next half-cycle starts with that outlet being opened to enable the discharge of further high-purity nitrogen.

3 Claims, 3 Drawing Figures

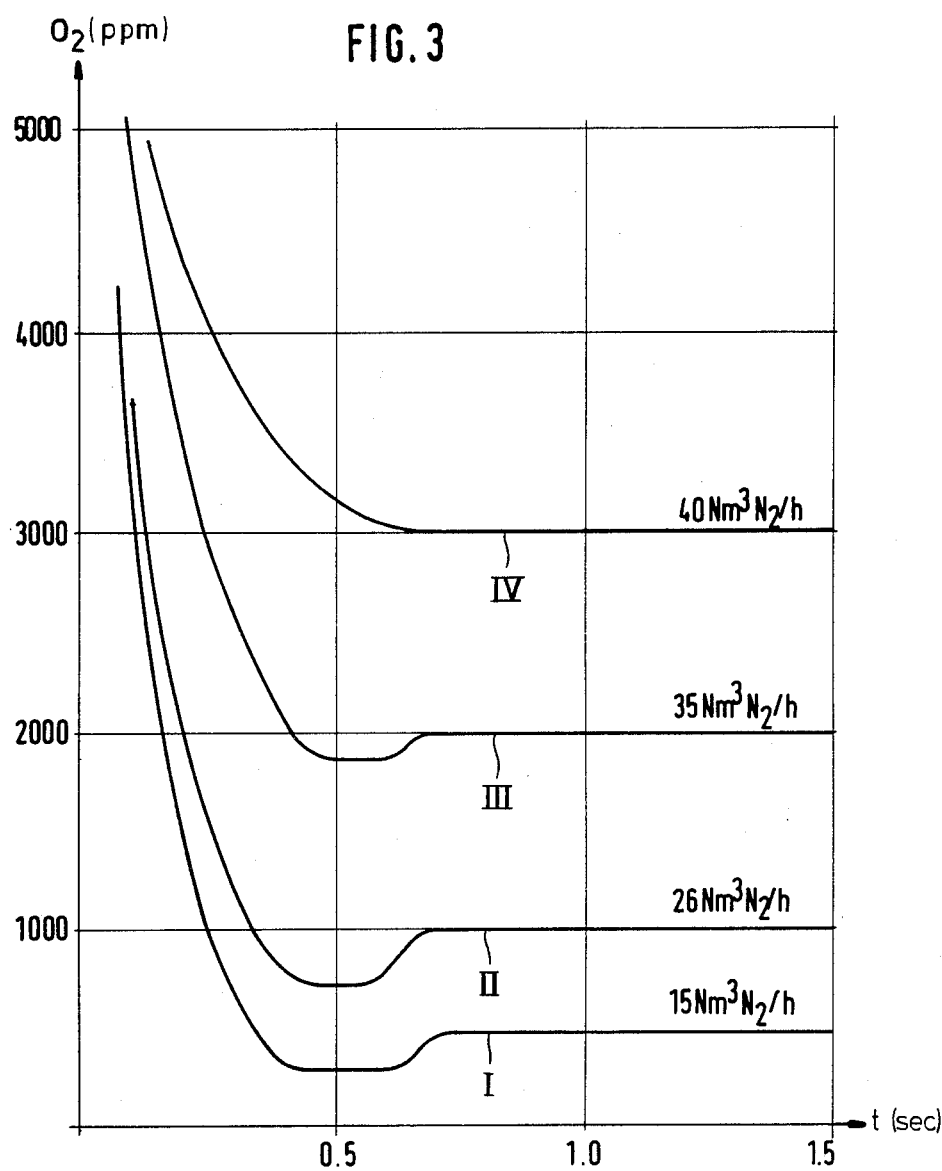

4,548,799

PROCESS FOR RECOVERING NITROGEN FROM OXYGEN-CONTAINING GAS MIXTURES

FIELD OF THE INVENTION

Our present invention relates to a process for the recovery of high-purity nitrogen from a gas mixture, such as atmospheric air, containing a significant proportion of oxygen besides nitrogen.

BACKGROUND OF THE INVENTION

For the recovery of selected constituents from a gas mixture it is known to utilize the so-called pressure-swing technique in which the initial gas mixture is alternately or cyclically fed to two or more adsorbers designed to retain the unwanted component or components; see, for example, U.S. Pat. No. 4,299,595. For the separation of nitrogen from a gas mixture such as air, in particular, it is known to use reactors containing adsorber beds in the form of carbonaceous molecular sieves—such as comminuted coke—which have a high affinity for oxygen and also tend to retain water vapor and carbon dioxide. With two alternately activated reactors of this character, the gas mixture (referred to hereinafter as air) is passed under high pressure through each adsorber-reactor in a respective production phase occupying a major part of a half-cycle of an operating cycle of predetermined duration, e.g. two minutes. While the active reactor discharges high-purity nitrogen as a product gas through an outlet thereof during the production phase of one half-cycle, its companion reactor is in a regeneration phase during which its internal pressure is lowered to or below atmospheric level by an at least partial removal of its gas content through venting or exhaustion. During the remaining minor part of that half-cycle, generally lasting for only a matter of seconds, the hitherto inactive companion reactor is preloaded with gas in a pressure-buildup phase immediately following its own regeneration phase and preceding the production phase of this reactor which starts at the beginning of the next half-cycle.

Naturally, the rate of the air flow admitted to either reactor and the capacity of its adsorber bed should be so correlated that, at the end of the chosen production phase, the active reactor should still be sufficiently unsaturated to keep the residual oxygen of the product gas below a maximum permissible level of, say, 1,000 parts per million (ppm). In order to increase the efficiency of a given adsorber bed, it has already been proposed to preload the previously inactive reactor before the beginning of its production phase with a gas whose initial nitrogen content is higher than that of air, namely some of the high-pressure gas still present in the interstices of the molecular sieve of the reactor whose production phase has just been terminated. This involves a temporary interconnection of the two paired reactors in a closed circuit, for an interval of several seconds representing an equalization period which forms part of the pressure-buildup phase of the just-regenerated reactor and during which the pressure differential between the two reactors drives the nitrogen-enriched gas into the reactor about to be activated.

OBJECT OF THE INVENTION

The object of our present invention is to provide a more efficient process for the recovery of high-purity nitrogen from air or similar gas mixtures by a pair of alternately activated reactors.

SUMMARY OF THE INVENTION

We have found, and tests have confirmed, that the flow of equalizing gas from the recently active reactor to the other reactor in the early part of the pressure-buildup phase of the latter begins to be counterproductive after only a fraction of the period required for full pressure equalization inasmuch as the oxygen content of the equalizing gas, initially well below that of air (close to 20 vol. %), rises rapidly above that value after a period of roughly one second under the operating conditions assumed above. Thus, we have determined that optimum operating efficiency can be achieved by switching from equalizing gas to a fresh gas mixture (air) after a small fraction of the buildup phase, specifically after about 0.3 to 0.7 sec. when the required pressure buildup is to be accomplished in about 5 seconds. That is to say that immediately upon the termination of the production phase of one reactor, lasting for 55 seconds in a specific instance, that reactor is directly connected to its companion reactor (which has just been vented or evacuated so that its internal pressure is at not more than atmospheric level) for a transfer period of a fraction of a second whereupon the first reactor is subjected to regeneration and the second reactor is connected to the supply of high-pressure air with its outlet still closed for a little more than 4 seconds. The opening of that outlet marks the end of the pressure-buildup phase and the beginning of the production phase of the second reactor, these two phases together coinciding with the regeneration phase of the first reactor.

In a nitrogen-recovery plant with twin reactors yielding a product gas at a rate of 26 $Nm^3/h$ with a residual oxygen content of 1,000 ppm by the aforedescribed conventional mode of operation, i.e. with a transfer period of 1.5 to 2.5 secs. in a 60-sec. half-cycle, a reduction of that transfer period to about 0.4 to 0.6 sec.—followed by completion of the pressure buildup with entering air—resulted in a lowering of the mean residual oxygen content of the product gas to about 800 ppm.

BRIEF DESCRIPTION OF THE DRAWING

The process according to our invention will now be described in detail with reference to the accompanying drawing in which:

FIG. 3 is a set of graphs showing the oxygen concentration in the product gas, for four different operating conditions, as a function of the duration of the transfer period.

SPECIFIC DESCRIPTION

Figure 1:
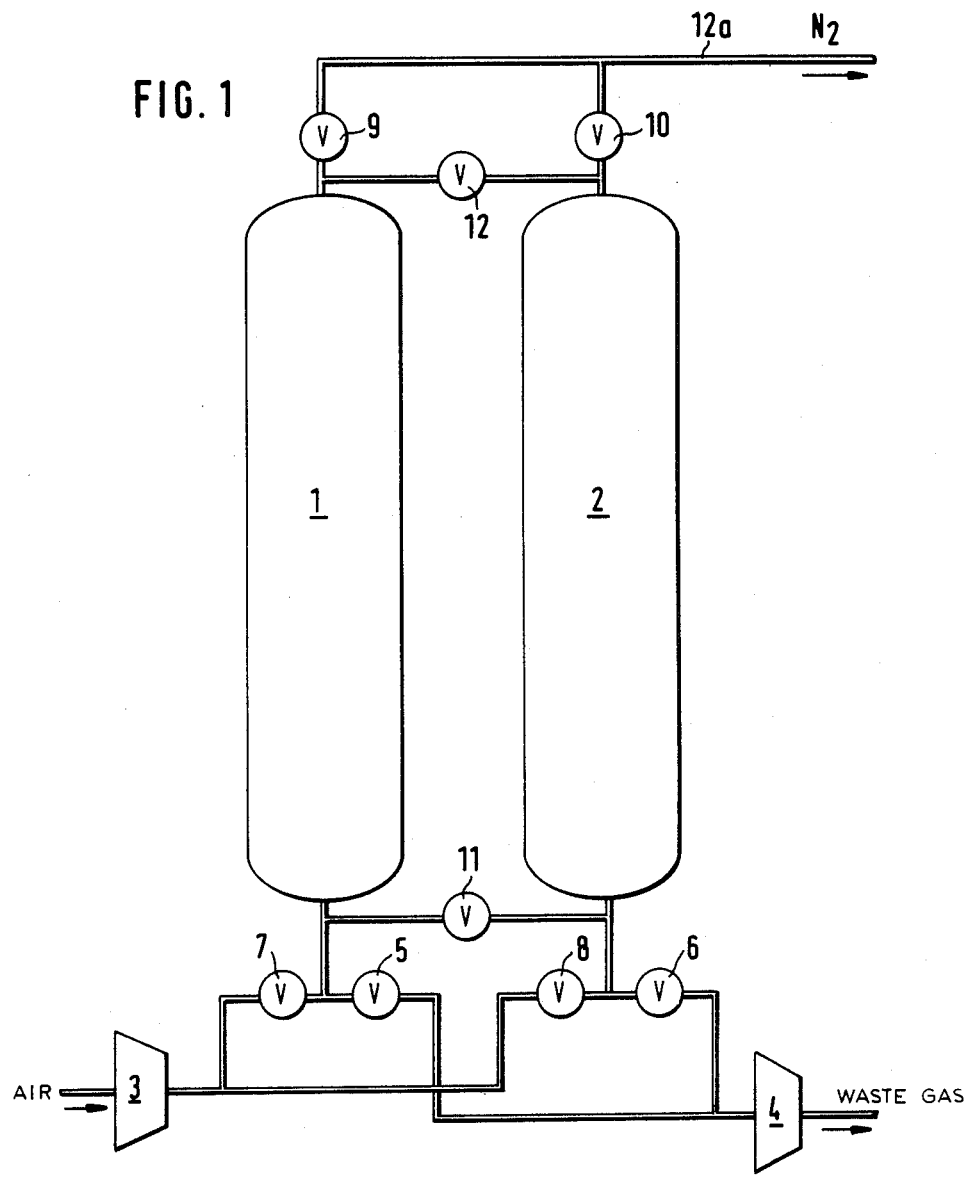
FIG. 1 is a diagrammatic representation of a nitrogen-recovery plant operable in accordance with our improved process.

The plant shown in FIG. 1 is a conventional structure comprising a pair of reactors 1 and 2 each containing an adsorber bed in the form of 400 liters of molecular-sieve coke. Reactor 1 has an inlet valve 7 connecting it with a source of air under pressure represented by a blower 3, an outlet valve 9 leading to a discharge line 12a for the recovery of a product gas $N_2$ of high-purity nitrogen, and an exhaust valve 5 leading to a vacuum pump 4 for the extraction of oxygen-enriched waste gas during a regeneration phase. Reactor 2 is correspondingly provided with an inlet valve 8, an outlet valve 10 and an exhaust valve 6. Two further valves 11 and 12 respectively interconnect the inlets and the outlets of the two reactors for letting gas flow therebetween in a pressure-equalizing phase.

In a specific instance, during steady-state operation, adsorbing reactor 1 receives air under a pressure of 3.5 bar via inlet valve 7 at a rate of 160 Nm$^3$/h at the beginning of a production phase of 55 seconds, marked by the opening of outlet valve 9 (with valves 5, 8 and 10–12 closed). At this point the internal pressure of the reactor, and thus the pressure of the outgoing product gas, is 2 bar; that gas pressure rises to 2.5 bar at the end of the production phase. The discharge rate of the product gas N$_2$ is 26 Nm$^3$/h.

The end of the production phase of reactor 1 coincides with the end of the regeneration phase of reactor 2 which has lasted for 59.5 secs. With reactor 2 evacuated by pump 4, all the previously open valves are closed and valves 11, 12 are opened for a transfer time of 0.5 sec. during which the pressure rises in reactor 2 to about 1.3 bar while dropping to somewhat more than that value in reactor 1. Next, valves 11 and 12 are closed whereupon valves 5 and 8 are opened to let blower 3 complete the pressure buildup in reactor 2 to 2.0 bar during a period of 4.5 secs. At the same time the pump 4 begins the exhaustion of reactor 1 over a period of 59.5 secs. during which waste gas with an oxygen content of 34% by volume is removed from that reactor at a rate of 134 Nm$^3$/h; the waste gas also contains water vapor and CO$_2$. The end of this regeneration phase, coinciding with the termination of the production phase of reactor 2, is followed by another transfer period of 0.5 sec. during which only valves 11 and 12 are open; the pressure in reactor 1 is thereby raised to about 1.3 bar and, after reclosure of valves 11, 12 and opening of valve 7 concurrently with the exhaustion of reactor 2 by way of valve 6, is increased to 2 bar as was the case with reactor 2 in the preceding half-cycle. The operations are then repeated in like manner.

In a somewhat different mode of operation of the plant of FIG. 1, vacuum pump 4 is omitted and the blower 3 is replaced by a compressor of higher power supplying air to the reactors under a pressure of 8 bar; the adsorber beds of the two reactors have a volume of 500 liters each. The mode of operation is the same as before, with the incoming air flowing at a rate of 250 Nm$^3$/h and the pressure of the product gas rising from 5.5 bar to 8 bar during the production phase. The product gas N$_2$, again containing only 800 ppm oxygen, is generated at a rate of 30 Nm$^3$/h during a venting phase in which the internal pressure of the inactive reactor drops to atmospheric level. The waste gas removed at the differential rate of 220 Nm$^3$/h in the regeneration phase has an oxygen content of 29%.

Figure 2:
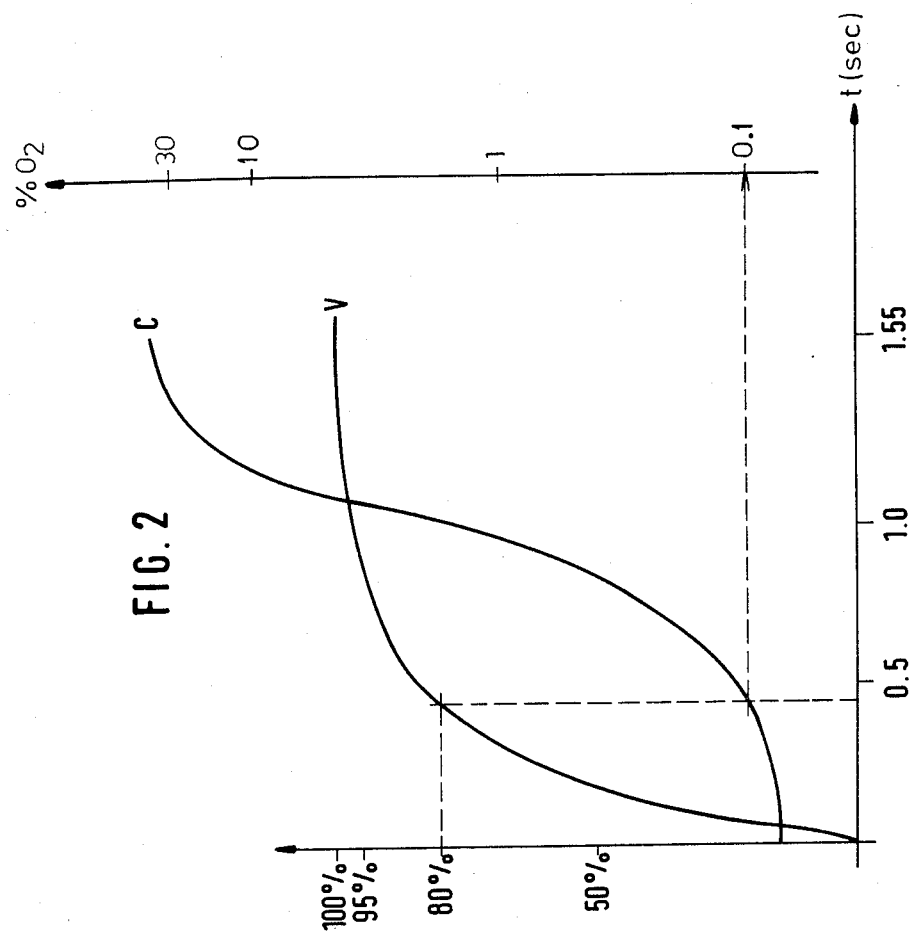
FIG. 2 is a diagram showing the amount of equalizing gas transferred and the resulting oxygen concentration in the product gas as functions of time.

In FIG. 2 we have plotted, as a function of time t, a curve V showing the volumetric proportion of equalizing gas transferred from the previously active reactor to the newly regenerated reactor during a period of nearly 2 secs. Another curve C shows the concentration of oxygen in the transferred equalizing gas during the same period. It will be noted that 80% of all the gas needed for pressure equalization is transferred in less than 0.5 sec. with an oxygen concentration of not more than 0.1 vol. %; during the next second, which in this example would be needed for complete pressure equalization, the oxygen concentration in the transfer gas rises sharply to 30 vol. %. This sharp rise is explainable by the fact that, as the transfer progresses, some of the equalizing gas leaving the high-pressure reactor comes from lower regions of its bed where it still has much of its original oxygen content; there could even be some desorption of oxygen from that bed. With the oxygen concentration of the equalizing gas reaching that of air after a little more than 1 sec., the advantage of using that gas for part of the pressure buildup in the reactor to be activated is lost with longer transfer.

In this connection it ought to be borne in mind that some of the equalizing gas passing from, say, reactor 1 to reactor 2 during a transfer period remains close to the top of the latter reactor and thus experiences only a partial reduction of its oxygen content in the regenerated adsorbent bed. Therefore, the transfer of equalizing gas via valves 11, 12 of FIG. 1 becomes less favorable than the admission of air from below after not much more than half a second.

Thus, as illustrated in FIG. 3, a switchover from equalizing gas to air after a transfer period of a fraction of a second is useful especially in those instances in which an oxygen concentration of less than 1,000 ppm is desired in the product gas. Curves I–IV of FIG. 3 show the oxygen concentration for an adsorber pair of given capacity, equivalent to that of the 400-liter coke bed per reactor referred to above, with different rates of nitrogen recovery ranging from 15 Nm$^3$/h for the lowest curve I to 40 Nm$^3$/h for the highest curve IV. Curve II corresponds, in fact, to the first example given with reference to FIG. 1 according to which nitrogen is recovered at a rate of 26 Nm$^3$/h; this curve shows a distinct dip between 0.3 and 0.7 sec., again representing the duration of the transfer period with which the average oxygen concentration in the product gas is about 800 ppm instead of 1,000 ppm representing the value for longer transfer periods. Curve I shows a similar dip to about 300 ppm, as compared with a final value of 500 ppm, whereas curve III with a recovery rate of 35 Nm$^3$/h shows a final value of 2,000 ppm dipping to about 1,900 ppm for a transfer period of approximately 0.4 to 0.7 sec. Curve IV never goes below a final value of 3,000 Nm$^3$/h.

We claim:

1. A process for the recovery of nitrogen with a residual oxygen content of 10 to 1000 parts per million from a gas mixture consisting predominantly of nitrogen and oxygen and containing both in substantial proportions, said process comprising the steps of:
   (a) passing said gas mixture under a high pressure through an active one of two alternately active adsorbers containing carbonaceous molecular sieve adsorption beds during a separation phase half-cycle while discharging high purity nitrogen as a product gas from said one of said adsorbers;
   (b) concurrently with step (a) evacuating the other of said adsorbers to desorb the same;
   (c) thereafter interconnecting said adsorbers on both sides of said beds for a limited period of 0.3 to 0.7 second to permit limited pressure transfer therebetween only for the duration of said limited period;
   (d) thereafter building up pressure in said other adsorber to said high pressure and commencing evacuation of said one adsorber; and
   (e) repeating steps (a) through (d) with cyclical alternation of said adsorbers as said one adsorber and said other adsorber with each repetition.

2. The process defined in claim 1 wherein step (a) lasts about 55 seconds, and step (d) is slightly more than 4 seconds.

3. The process defined in claim 2 wherein step (b) is slightly more than 59 seconds.

* * * * *